(12) United States Patent
Terashima et al.

(10) Patent No.: US 7,699,134 B2
(45) Date of Patent: Apr. 20, 2010

(54) MOTORCYCLE EXHAUST SYSTEM

(75) Inventors: Yasuto Terashima, Shizuoka-ken (JP); Hirotoshi Takeshita, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1073 days.

(21) Appl. No.: 11/374,628

(22) Filed: Mar. 13, 2006

(65) Prior Publication Data
US 2006/0201742 A1    Sep. 14, 2006

(30) Foreign Application Priority Data

| Mar. 11, 2005 | (JP) | ............................... 2005-069761 |
| Jun. 1, 2005 | (JP) | ............................... 2005-161445 |
| Oct. 31, 2005 | (JP) | ............................... 2005-316085 |

(51) Int. Cl.
*B60K 13/04* (2006.01)
(52) U.S. Cl. ................. 180/309; 180/89.2; 180/219
(58) Field of Classification Search ........... 180/68.3, 180/89.2, 219, 296, 309; 181/227, 228, 241, 181/247, 249–255
See application file for complete search history.

(56) References Cited

U.S. PATENT DOCUMENTS

| 3,972,685 | A | * | 8/1976 | Hanaoka ...................... 422/175 |
| 4,354,349 | A | * | 10/1982 | Otani et al. ..................... 60/299 |
| RE31,989 | E | * | 9/1985 | Nomura et al. ............. 180/219 |
| 4,553,388 | A | * | 11/1985 | Okubo et al. ................. 60/276 |
| 4,776,422 | A | * | 10/1988 | Sakuma ....................... 180/219 |
| 4,809,800 | A | | 3/1989 | Suzuki et al. |
| 4,858,722 | A | * | 8/1989 | Abbe et al. ................. 181/243 |
| 4,860,538 | A | * | 8/1989 | Takeuchi ..................... 60/313 |
| 4,913,256 | A | * | 4/1990 | Sakuma ..................... 180/229 |
| 4,913,260 | A | * | 4/1990 | Fallon ........................ 181/254 |
| 4,964,484 | A | * | 10/1990 | Buell ........................... 180/219 |
| 5,271,480 | A | * | 12/1993 | Takegami ................... 180/309 |
| 5,351,481 | A | * | 10/1994 | Flugger ....................... 60/273 |
| 5,360,081 | A | * | 11/1994 | Takegami ................... 180/309 |
| 5,519,994 | A | * | 5/1996 | Hill ............................... 60/313 |
| 5,726,397 | A | * | 3/1998 | Mukai et al. ................ 181/232 |

(Continued)

FOREIGN PATENT DOCUMENTS

DE         4330129 A1    3/1995

(Continued)

OTHER PUBLICATIONS

European Search Report; May 24, 2006; 5 pages.

*Primary Examiner*—Paul N Dickson
*Assistant Examiner*—Vaughn T Coolman
(74) *Attorney, Agent, or Firm*—Keating & Bennett, LLP

(57) ABSTRACT

A motorcycle has an exhaust system configured to extend below the engine while providing a sufficient length and a sufficient angle of through which the motorcycle can lean. A muffler unit comprises a first muffler connected with the exhaust pipe unit and disposed between the engine and a rear wheel. The muffler unit also comprises a second muffler that is connected with the first muffler and that is disposed near the side of the rear wheel. The first muffler comprises inclined portions that are formed on the left and right sides of the first muffler when viewed from the front of the vehicle. The second muffler has inclined portions that extend at an angle approximately equal to that of the inclined portions of the first muffler.

6 Claims, 17 Drawing Sheets

U.S. PATENT DOCUMENTS

| | | | | |
|---|---|---|---|---|
| 5,853,216 | A * | 12/1998 | Barg | 296/78.1 |
| 5,966,933 | A * | 10/1999 | Ishihara et al. | 60/322 |
| 5,979,583 | A * | 11/1999 | Amino et al. | 180/219 |
| 6,026,930 | A * | 2/2000 | Ogisu et al. | 181/228 |
| 6,193,004 | B1 * | 2/2001 | Cooksey et al. | 180/219 |
| 6,334,501 | B1 * | 1/2002 | Kawamoto | 180/309 |
| 6,584,767 | B1 * | 7/2003 | Koenig | 60/288 |
| 6,719,084 | B2 * | 4/2004 | Kuji et al. | 180/309 |
| 6,745,863 | B2 * | 6/2004 | Kanda et al. | 180/309 |
| 6,804,955 | B2 * | 10/2004 | Bassani | 60/313 |
| 6,941,751 | B2 * | 9/2005 | Yamamoto et al. | 60/322 |
| D523,787 | S * | 6/2006 | Johnson | D12/126 |
| 7,290,388 | B2 * | 11/2007 | Kikuchi et al. | 60/323 |
| 7,320,378 | B2 * | 1/2008 | Inaoka et al. | 180/225 |
| 7,347,045 | B2 * | 3/2008 | Bozmoski et al. | 60/312 |
| 7,364,002 | B2 * | 4/2008 | Mabuchi et al. | 180/296 |
| 7,364,010 | B2 * | 4/2008 | Konno | 181/228 |
| 2002/0022416 | A1 * | 2/2002 | Lecours et al. | 440/89 |
| 2002/0096392 | A1 * | 7/2002 | Noe et al. | 181/231 |
| 2002/0153187 | A1 * | 10/2002 | Tsukui et al. | 180/219 |
| 2003/0056503 | A1 * | 3/2003 | Bassani | 60/313 |
| 2003/0079938 | A1 * | 5/2003 | Yamaguchi | 181/227 |
| 2005/0081516 | A1 * | 4/2005 | Inaoka et al. | 60/324 |
| 2005/0236205 | A1 * | 10/2005 | Konno | 180/219 |
| 2006/0000205 | A1 * | 1/2006 | Bozmoski et al. | 60/324 |

FOREIGN PATENT DOCUMENTS

| | | |
|---|---|---|
| EP | 1247955 A1 | 10/2002 |
| JP | 56143311 A | 11/1981 |
| JP | 59005824 A | 1/1984 |
| JP | 05231145 A | 9/1993 |
| JP | A-2002-303133 | 10/2002 |

* cited by examiner

MOTORCYCLE EXHAUST SYSTEM

RELATED APPLICATIONS

This application claims the priority of Japanese Patent Application No. 2005-316085, filed Oct. 31, 2005, Japanese Patent Application No. 2005-161445, filed Jun. 1, 2005 and Japanese Patent Application No. 2005-069761, filed Mar. 11, 2005, each of which is here by incorporated by reference in its entirety.

BACKGROUND OF THE INVENTION

1. Field of the Invention

The present invention generally relates to motorcycle exhaust systems. More particularly, the present invention relates to a motorcycle exhaust systems that comprise an exhaust pipe unit connected with an engine and a muffler unit connected with the exhaust pipe unit.

2. Description of the Related Art

In some motorcycles, a muffler is disposed below an engine of the motorcycle to lower the center of gravity of the vehicle as much as possible. Such a placement of the muffler lowers the center of gravity because the muffler typically is a heavy component. JP-A-2002-303133 discloses such a construction. In the Japanese reference, an engine is mounted between front and rear wheels. The exhaust gas from the engine is discharged through the exhaust pipe that extends from the engine. A silencer, or muffler, is attached to the end of the exhaust pipe. The silencer has a gas outlet that is positioned near the gas inlet. The silencer is mounted on a lower part of the engine such that the gas inlet faces the rear wheel and the exhaust pipe is connected to the gas inlet of the silencer because it extends toward the region of the rear wheel. In other words, the exhaust pipes of some cylinders extend to the region of a rear wheel to connect with the muffler from the rear while the exhaust pipes of the other cylinders extend above the muffler to connect with the first set of exhaust pipes.

In such an exhaust system, some of the exhaust pipes extend along a lateral side of the muffler such that the traverse dimension (e.g., the side-to-side measurement) of the motorcycle must be increased to accommodate both the exhaust pipes and the muffler. The increased transverse dimension at such a lowered location reduces the angle to which the motorcycle can be leaned during cornering.

In addition, some of the exhaust pipes extend through a region between a lower portion of the engine and an upper portion of the muffler. Thus, the engine needs to be mounted relatively high to accommodate the exhaust pipes. The muffler generally cannot be further lowered due to the desire for maintaining sufficient minimum road clearance. As a result of the engine being relatively raised, the center of gravity of the motorcycle is necessarily elevated.

SUMMARY OF THE INVENTION

One aspect of the present invention involves a motorcycle comprising an engine with an exhaust pipe unit connected with the engine at a first end. The exhaust pipe unit extends between the engine and a surface over which the motorcycle operates. A muffler unit connects with the exhaust pipe unit and comprises a first muffler and a second muffler. The first muffler is connected with a second end of the exhaust pipe unit. The first muffler is positioned between the engine and a rear wheel. The first muffler comprises inclined lateral side walls that extend at a first angle such that the inclined lateral side walls extend upward and outward when viewed from a front of the vehicle. The second muffler is connected with the first muffler and is disposed near the side of the rear wheel. The second muffler extends rearward of the first muffler while being laterally inclined at a second angle approximately equal to the first angle of the inclined lateral side walls of the first muffler.

BRIEF DESCRIPTION OF THE DRAWINGS

These and other features, aspects and advantages will be described in detail below with reference to several drawings.

DETAILED DESCRIPTION OF THE PREFERRED EMBODIMENTS

Figure 1:
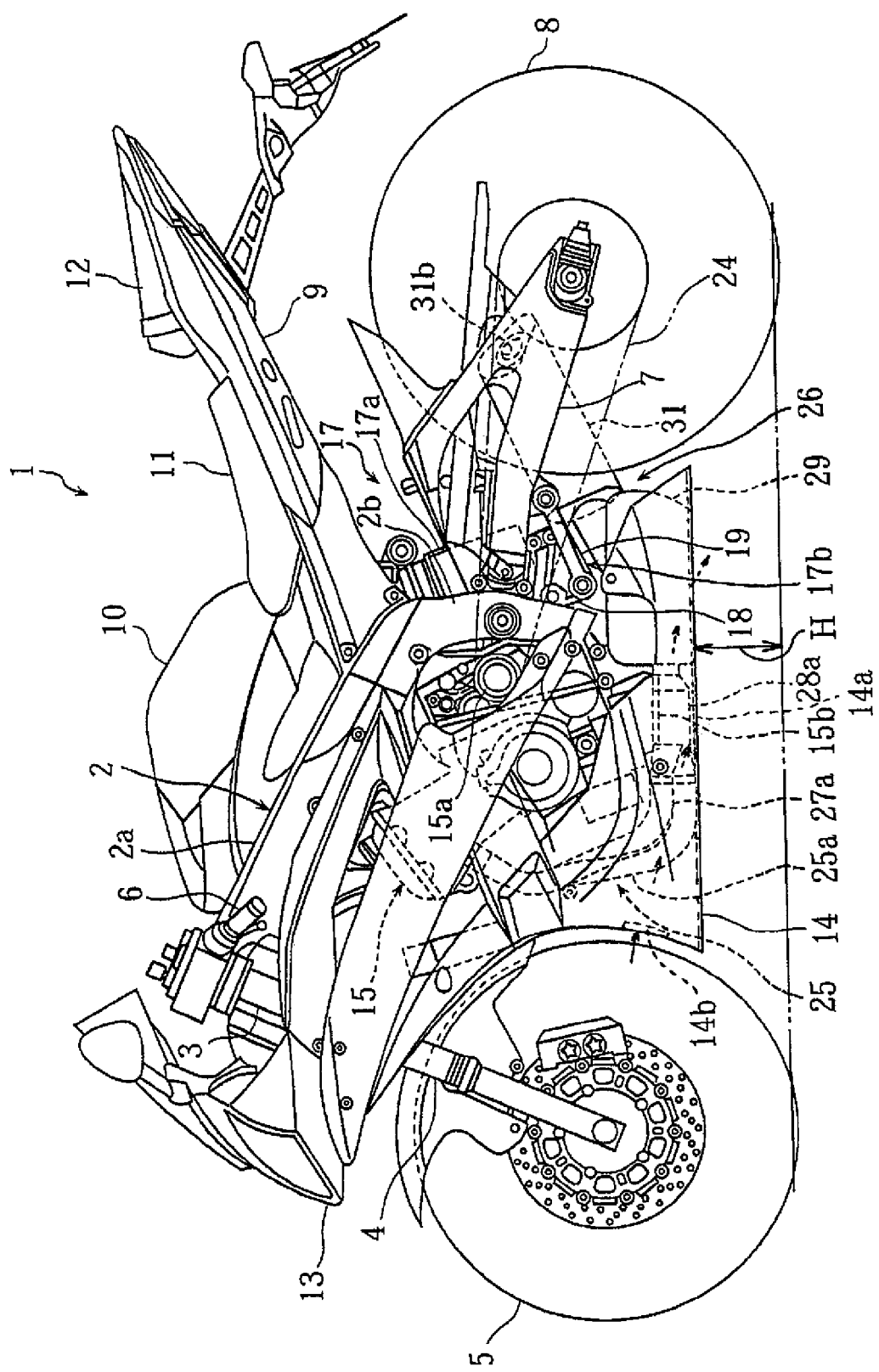
FIG. 1 is a side view of a motorcycle comprising an exhaust system that is arranged and configured in accordance with certain features, aspects and advantages of the present invention.

With reference now to FIGS. 1 through 12, an exhaust system is shown that is arranged and configured in accordance with certain features, aspects and advantages of the present invention. In the following description, the front-to-rear and right-to-left directions refer to the front-to-rear and right-to-left directions as viewed from a rider sitting on a seat.

In the figures, a motorcycle 1 generally comprises a front fork 4 that is supported by a head pipe 3 such that the front fork 4 can be steered to the left and right directions. The head pipe 3 is attached to the front end of a vehicle body frame 2. The vehicle body frame can be made of an aluminum alloy or any other suitable material. A front wheel 5 and steering handlebars 6 are disposed at the lower end and the upper end of the front fork 4, respectively. Left and right rear brackets 2b of the vehicle body frame 2 support a rear arm 7 such that the rear arm 7 can pivot upward and downward. A rear wheel 8 is disposed at the rear end of the rear arm 7.

The vehicle body frame 2 comprises left and right main frames 2a, 2a that extend diagonally downward to the rear of the vehicle from the head pipe 3. The vehicle body frame 2 also comprises the rear arm brackets 2b that extend substantially vertically downward from the rear portions of the left and right main frames 2a, 2a. The vehicle body frame 2 also comprises a seat rail 9 that extends generally diagonally upward toward the rear of the vehicle from the rear portions of the left and right main frames 2a, 2a.

The left and right main frames 2a, 2a carry a fuel tank 10. The seat rail 9 supports a main seat 11 and a tandem seat 12. Other seating configurations also can be used. A front cover 13 extends over a front region of the front fork 4. In the illustrated configuration, an under cowl 14 generally shrouds the lower regions of the left and right main frames 2a.

Figure 4:
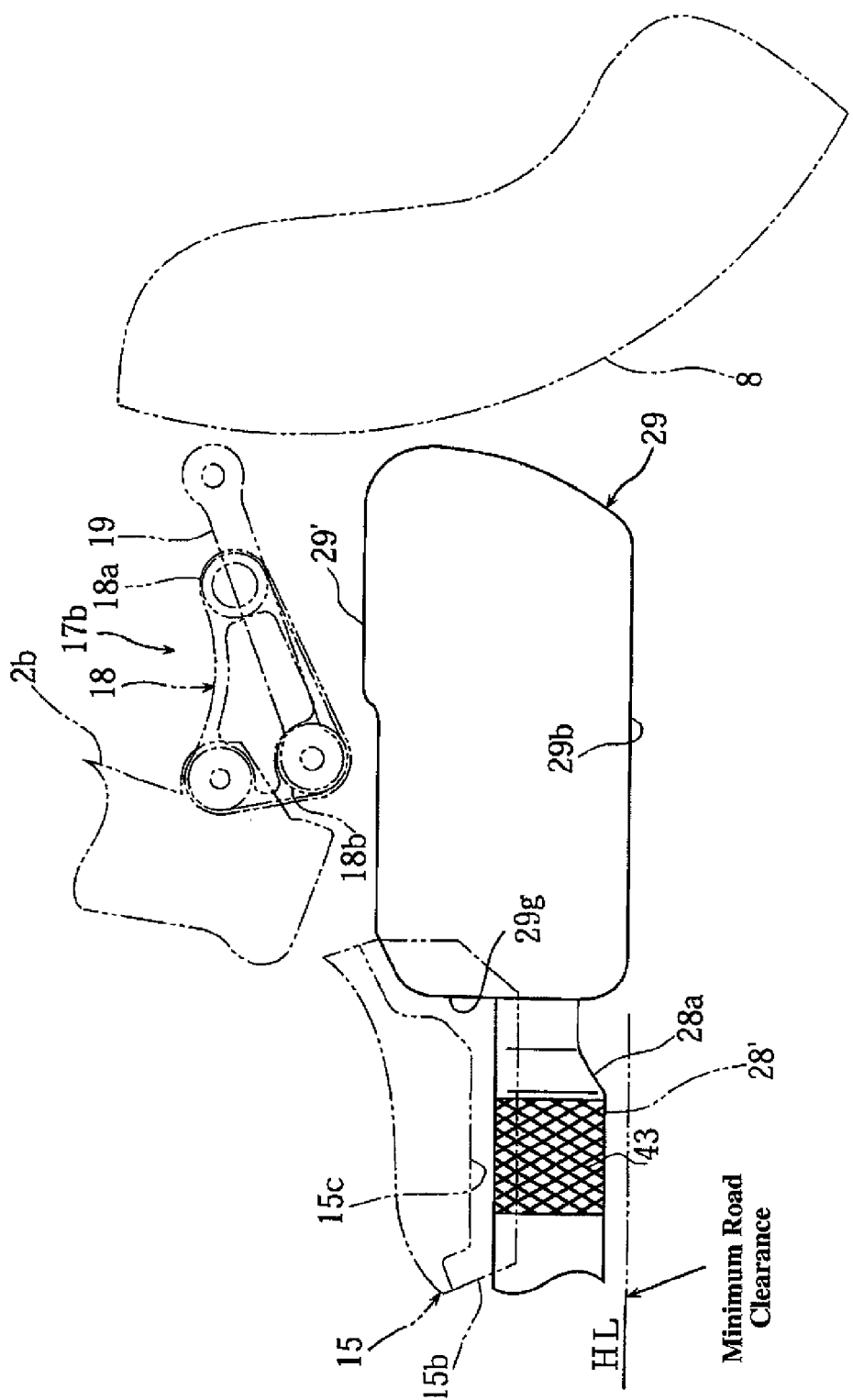
FIG. 4 is a simplified side elevation view of a portion of the exhaust system of FIG. 1.
Figure 5:
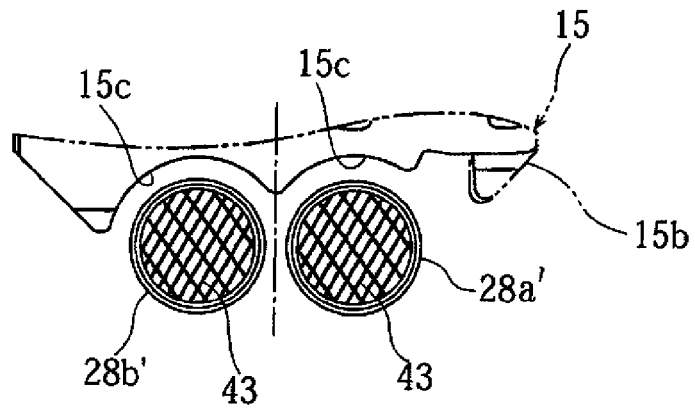
FIG. 5 is a cross-sectional view of an exhaust pipe unit in the exhaust system of FIG. 1.

A rear suspension 17 extends between the rear arm 7 and the vehicle body frame 2. The rear suspension 17 comprises a damper 17a. An upper end of the damper 17a is connected with a cross pipe (not shown). With reference to FIG. 4, the rear suspension 17 also comprises a link mechanism 17b that is connected with the lower end of the damper 17a. The illustrated link mechanism 17b comprises a triangular link member 18 and a link arm 19. The link member 18 connects to the rear arm bracket 2b. A front end of the link arm 19 connects with a lower end 18b of the link member 18. The rear end of the link arm 19 connects with the rear arm 7 (see FIG. 1). The lower end of the damper 17a connects with a rear end 18a of the link member 18 (see FIGS. 1 and 4).

Figure 2:
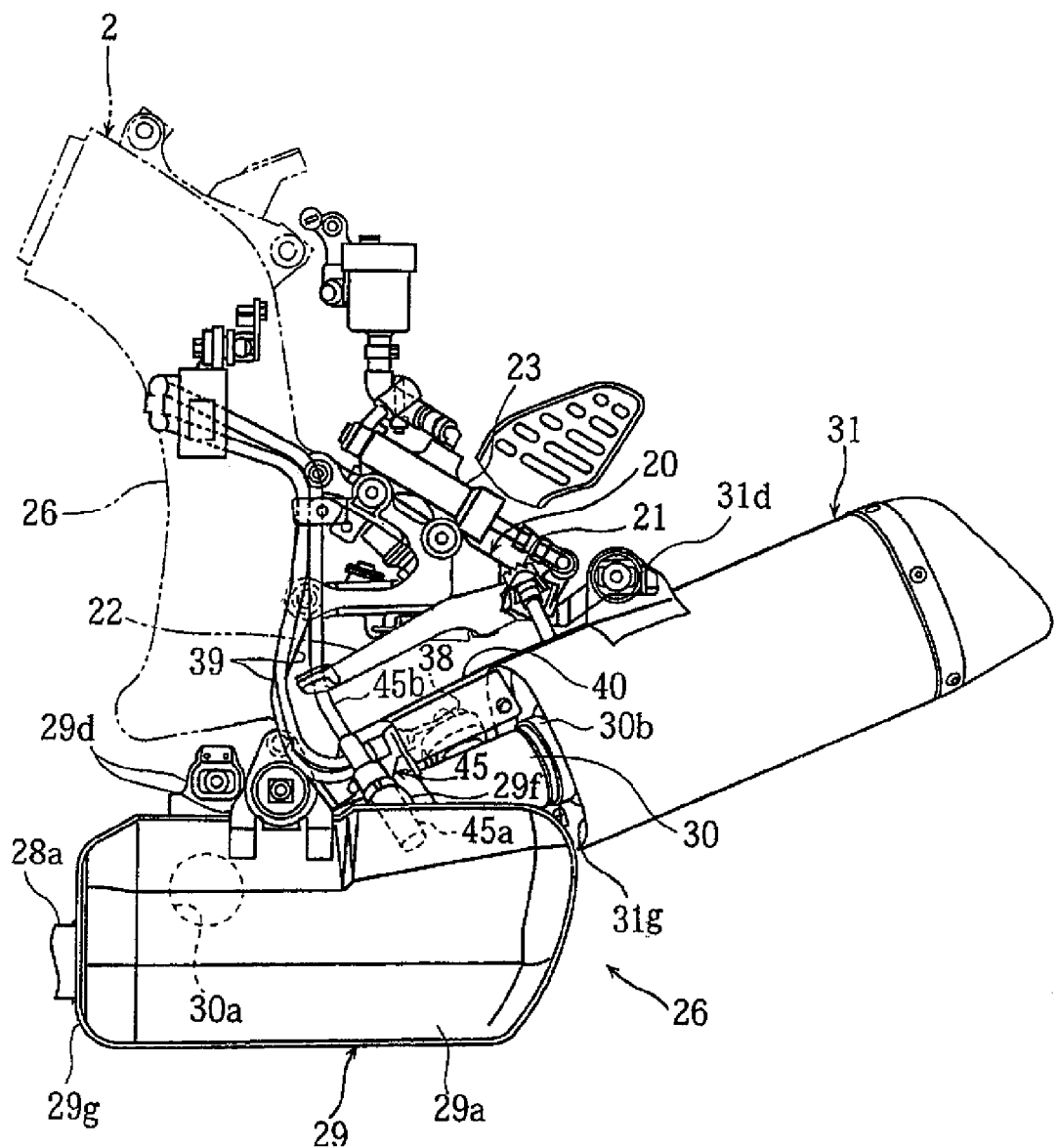
FIG. 2 is a simplified side elevation view that depicts a portion of the exhaust system of FIG. 1.
Figure 3:
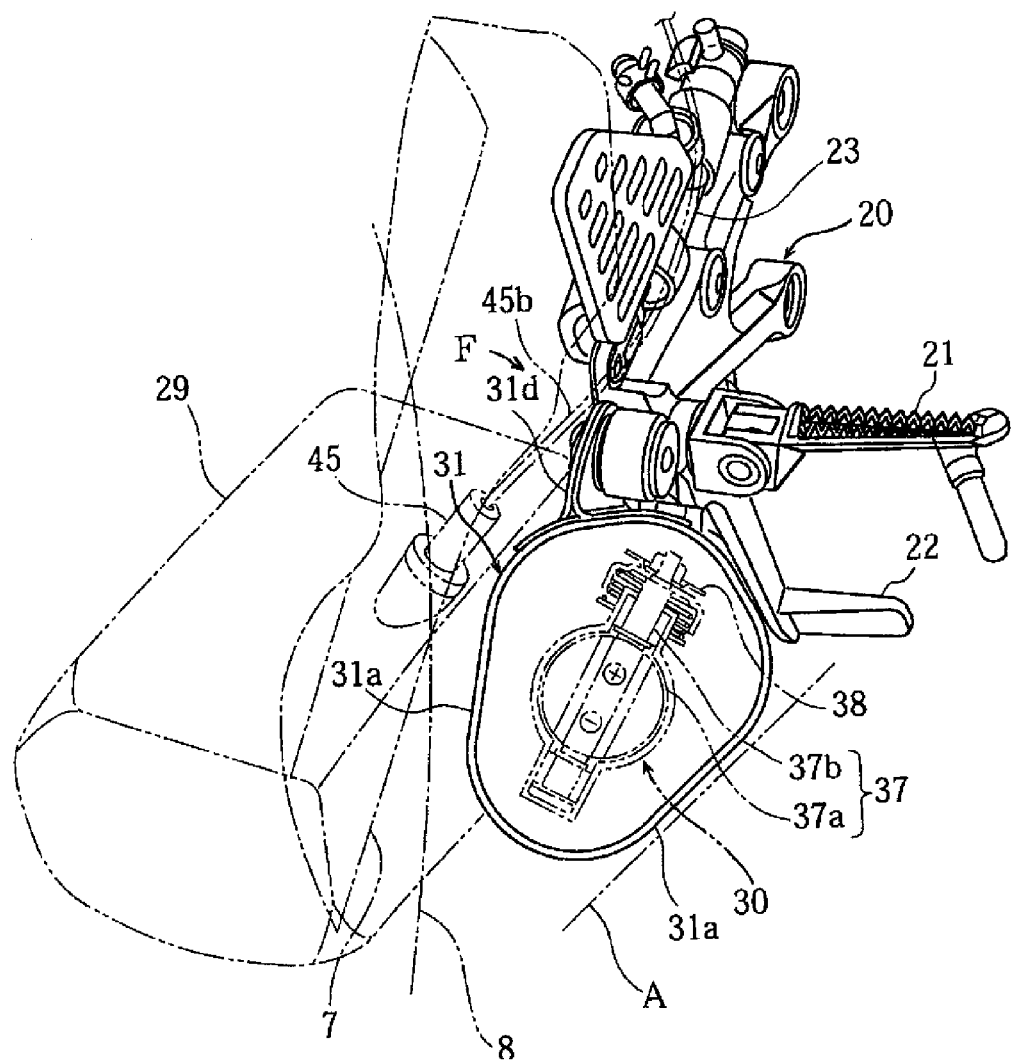
FIG. 3 is a perspective view that illustrates a portion of the exhaust system of FIG. 1 as viewed from a rear lateral side of the vehicle.

With reference now to FIG. 2 and FIG. 3, foot rest brackets are mounted to the left and right rear arm brackets 2b, 2b. In the illustrated configuration, the brackets each comprises a forked front end 20, 20 that is connected to the respective arm bracket 2b, 2b. The foot rest brackets extend toward the rear from the forked front end 20, 20. Foot rests 21, 21 are attached to the rear ends of the left and right foot rest brackets 20, 20. With reference to FIG. 3, a brake pedal 22 can be attached to the inside of the foot rest 21 of the left foot rest bracket 20 such that the brake pedal 22 can pivot in a generally vertical direction. The brake pedal 22 preferably actuates a master cylinder 23.

With reference again to FIG. 1, the left and right main frames 2a, 2a and the rear arm brackets 2b, 2b suspend and support an engine 15. The engine 15 preferably comprises a water-cooled 4-cycle parallel 4-cylinder engine. When mounted, the engine's cylinder axis preferably inclines forward. In one configuration, a gearing chain 24 connects an output shaft 15a of the engine 15 with the rear wheel 8.

An air intake unit extends above the engine 15 and an exhaust system 25 extends generally below the engine 15. The engine 15 mounts below a lower surface of the main frame 2a to lower a center of gravity of the vehicle. A generally large capacity air cleaner (not shown) can be provided in a space between the engine 15 and the fuel tank 10, which space results from the illustrated position of the engine 15.

The exhaust system 25 comprises an exhaust pipe unit 25a and a muffler unit 26. The exhaust pipe unit 25a connects with the engine 15 and the muffler unit 26 connects with the exhaust pipe unit 25a.

Figure 9:
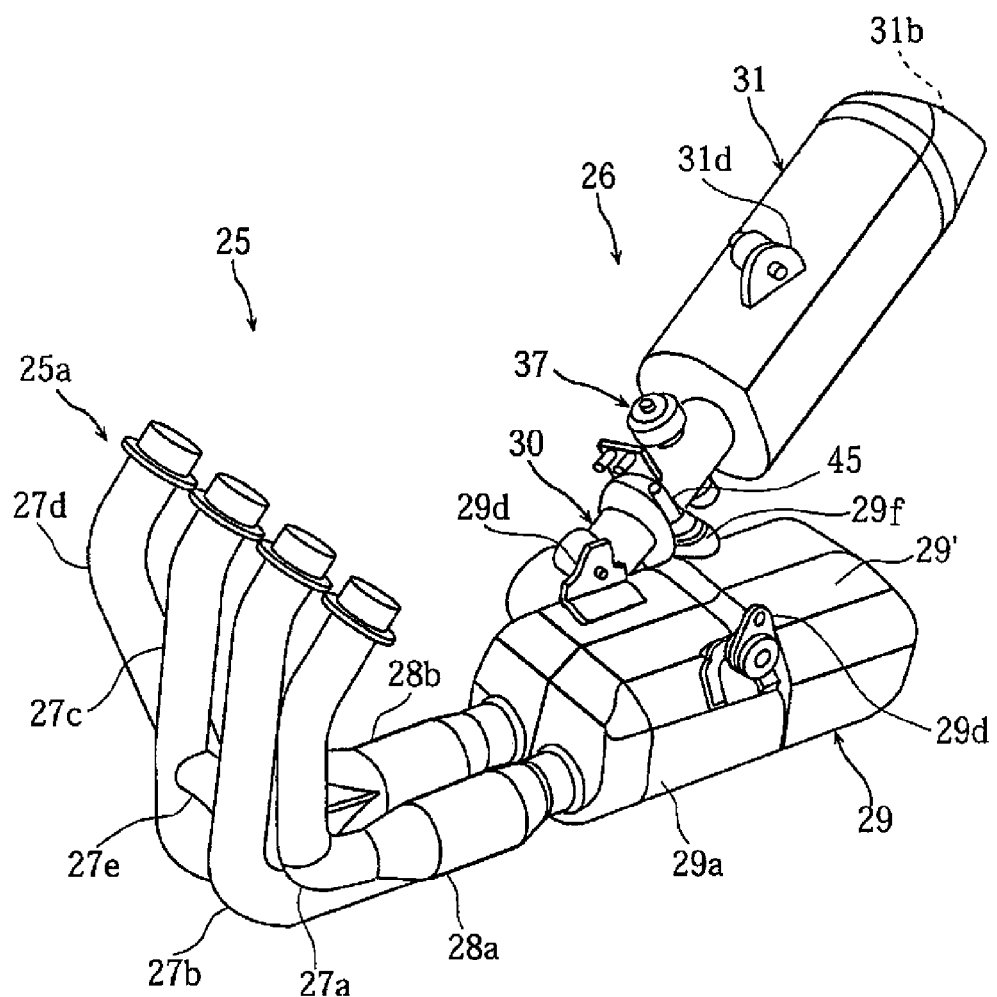
FIG. 9 is a perspective view of the exhaust system of FIG. 1.
Figure 10:
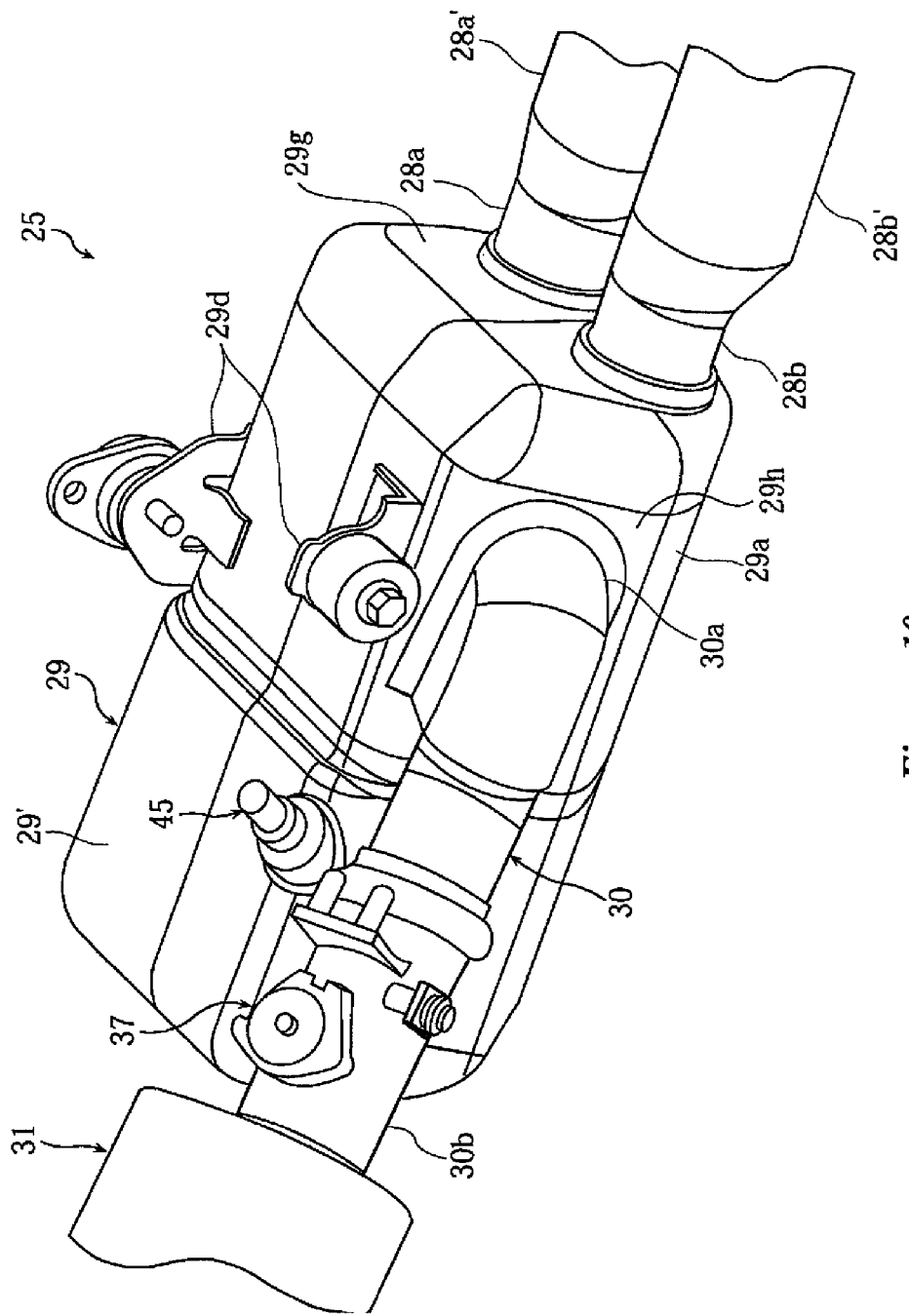
FIG. 10 is a perspective view of a first muffler of the exhaust system of FIG. 1.

Given the engine configuration described above, the illustrated exhaust pipe unit 25a comprises four exhaust pipes 27a-27d. As shown in FIG. 1 and FIG. 9, the four exhaust pipes 27a-27d extend generally downwardly proximate the front region of the engine 15, bend rearwardly below an oil pan 15b of the engine 15, and extend further toward the rear to a pair of left and right junction pipes 28a and 28b. In the illustrated configuration, the left junction pipe 28a unifies the left two exhaust pipes 27a and 27b into one pipe and the right junction pipe 28b unifies the right two exhaust pipes 27c and 27d into one pipe, respectively. Other configurations also are possible. Preferably, the inside two exhaust pipes 27b and 27c communicate with each other at an intermediate position through a communicating pipe 27e.

The left and right junction pipes 28a and 28b extend toward the rear along the bottom surface of the oil pan 15b in the illustrated configuration. In a preferred configuration, a bottom portion of the oil pan 15b comprises concave recesses 15c, 15c that accommodate upper portions of the left and right junction pipes 28a, 28b, respectively (see FIGS. 4 and 5). The illustrated configuration allows the engine 15 to be mounted lower while maintaining adequate road clearance between the ground the left and right junction pipes 28a and 28b.

The muffler unit 26 comprises a first muffler 29 connected with the left and right junction pipes 28a and 28b and a second muffler 31 connected with the first muffler 29 via a connecting pipe 30 or other suitable connecting passage.

The first muffler 29 comprises a substantially rectangular component. In the illustrated configuration, the first muffler 29 comprises left and right halves that combine together to define the first muffler 29. Other configurations are possible. In one configuration, the first muffler 29 mounts between the oil pan 15b of the engine 15 and the rear wheel 8. Preferably, in this configuration, the first muffler is positioned below the foot rest 21. A cross frame member of the rear arm bracket 2b can support the first muffler 29 using left and right attachment brackets 29d, 29d (see FIG. 9) provided on the first muffler 29.

With reference to FIG. 4, a rear portion 29' of the first muffler 29 positioned rearward of the link member 18 expands upward. Preferably, the rear portion 29 is limited in its upward expansion such that the rear portion 29' will not interfere with movement of the link arm 19. Such a configuration expands the capacity of a rear expansion chamber b, which will be described in greater detail later.

The second muffler 31 is substantially cylindrical, and is disposed on the one side of the rear wheel 8. In the illustrated configuration, the second muffler 31 is disposed to the right side of the rear wheel 8. Preferably, the second muffler 31 extends diagonally upward such that a majority of the second muffler 31, including a discharge port 31b, is disposed within a projection of the rear wheel 8 as viewed from the side of the vehicle. In one configuration, the second muffler 31 does not extend rearward further than the rear wheel. In another configuration, the second muffler 31 does not extend rearward further than an axle of the rear wheel. In a further configuration, the second muffler does not extend upward beyond the rear wheel. In yet a further configuration, the second muffler does not extend upward beyond the rear arm 7. In one other configuration, the second muffler does not extend upward any higher than the exhaust discharge ports from the engine. The second muffler 31 preferably is arranged such that the upper end plane of the discharge port 31b and the upper plane of the rear arm 7 are at substantially the same level when viewed from the side of the vehicle (see FIG. 1). The second muffler 31 can be suspended and supported by the foot rest bracket 20 by an attachment member 31d formed on the second muffler 31.

Figure 6:
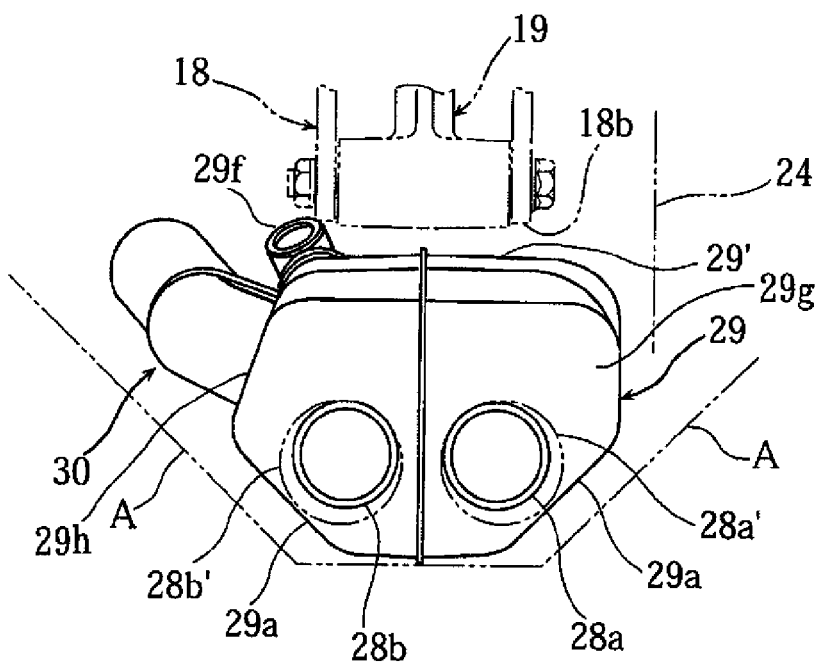
FIG. 6 is a front view of a first muffler in the exhaust system of FIG. 1.

With reference to FIG. 6, inclined portions 29a, 29a are formed on the left and right lower portions of the illustrated first muffler 29, when the first muffler 29 is viewed from the front of the motorcycle. The inclined portions 29a, 29a increase the angle of lean possible with the illustrated motorcycle. The left and right inclined portions 29a extend upward in an outward direction in the vehicle width direction (i.e., the transverse direction). Preferably, the height of the first muffler 29 is determined such that the lowest portion of a bottom surface 29b substantially corresponds with a line HL that indicates a desired minimum road clearance H (see FIGS. 1 and 4).

As used herein, the minimum road clearance HL refers to a clearance between the road surface and the lowest portion of the vehicle positioned between the tires and excluding the tires when the vehicle is standing generally vertically with no load. The minimum road clearance HL can be established in its lowermost state when the the lowest portion of the vehicle between the wheels does not contact the road surface even when the front and rear wheels are at the maximum stroke or when the lowest portion of the vehicle between the wheels does not contact the boundary between a load-carrying platform of a truck or the like and an inclined passage when the inclined passage is used to load the vehicle on the platform for transportation of the vehicle. Thus, the first muffler 29 in this embodiment is disposed at the lowest possible position where the muffler 29 does not contact the road surface at the time of the maximum stroke or other occasions. This structure therefore contributes to lowering the center of gravity of the vehicle.

With reference to FIG. 3, the illustrated second muffler 31 has a substantially triangular shape having left and right inclined sides 31a, 31a as viewed in cross-section. The right inclined side 31a is inclined substantially at the same angle as that of the inclined portion 29a of the first muffler 29. Thus, in one preferred configuration, the exhaust pipe unit 25a and the first and second mufflers 29 and 31 are disposed within an oblique line A that indicates an angle of bank. In a more preferred configuration, the exhaust pipe unit 25a, the first and second mufflers 29, 31, and all other components of the exhaust system which will be discussed later are disposed within the oblique line A indicating the angle of bank (see FIG. 8). In one configuration, the outer surface of the second muffler 31 defines a plane that extends at an angle relative to a vertical plane and at least the first and second mufflers 29, 31 are positioned such that they are completely on the same side of the angled plane as the vertical plane, which generally extends through a center of the rear wheel.

Figure 11:
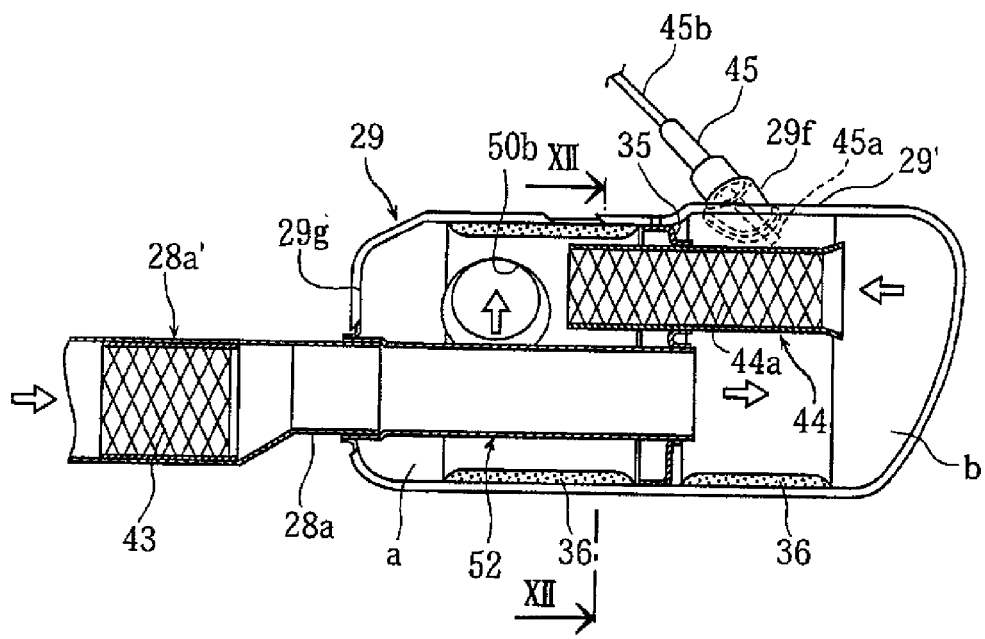
FIG. 11 is a side cross-sectional view of the first muffler of FIG. 10.
Figure 12:
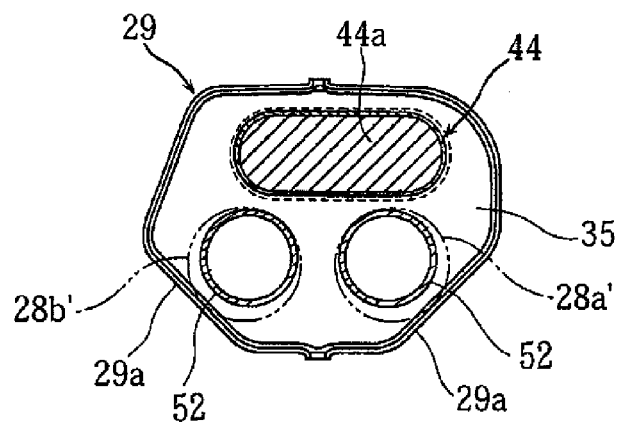
FIG. 12 is a front cross-sectional view of the first muffler of FIG. 10 taken along the line XII-XII in FIG. 11.
Figure 13:
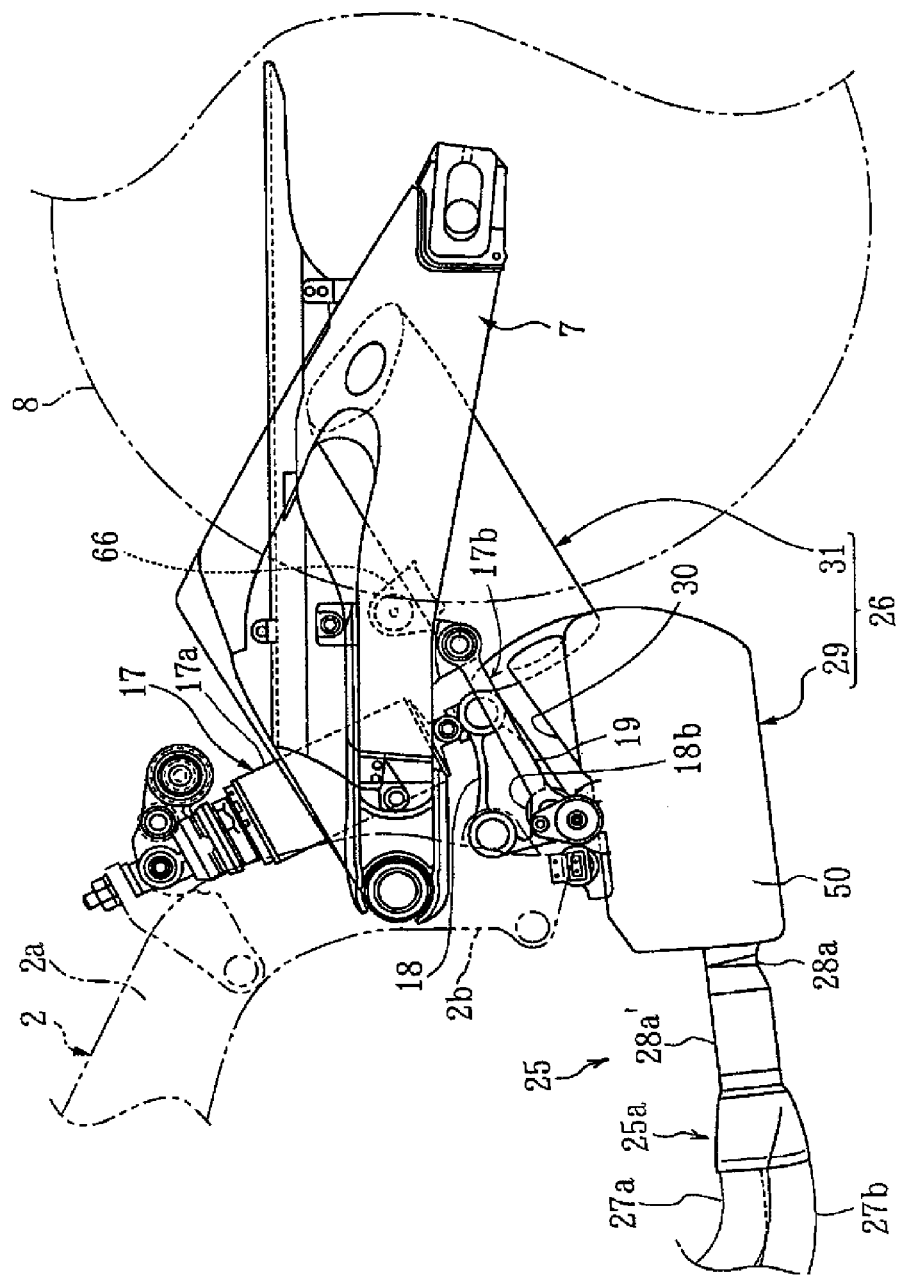
FIG. 13 is a side view of another exhaust system that is arranged and configured in accordance with certain features, aspects and advantages of the present invention.

With reference to FIG. 11, the interior of the illustrated first muffler 29 is divided by a partition wall 35 into a second expansion chamber a, which is provided at the front, and the first expansion chamber b, which is provided at the rear. In a preferred configuration, the second and first expansion chambers a, b have approximately the same capacity and communicate with each other through a second communicating pipe 44. Glass wools 36, 36 can be affixed to the inner surfaces of the second and first expansion chambers a and b to reduce exhaust noise, to reduce temperature increase due to the passage of the exhaust gas and generation of shell noise.

The left and right junction pipes 28a and 28b preferably connect with a front wall 29g of the first muffler 29. The left and right junction pipes 28a and 28b can be connected with a first communicating pipe 52 which extends from the front wall 29g of the first muffler 29 through the second expansion chamber a and penetrates through the partition wall 35 to open within the first expansion chamber b. In one configuration, the rear end of the first communicating pipe 52 comprises an air-tight connection with the partition wall 35. Because the length of the exhaust pipe unit is extended substantially by the portions passing through the second expansion chamber a, a sufficient length of the expansion pipe unit 25a can be secured. Accordingly, the torque in the medium speed range can be enhanced.

An exhaust outlet 50b is formed on a right wall 29h of the illustrated second expansion chamber a in the first muffler 29. In one configuration, an upstream port 30a of the connecting pipe 30 (see FIG. 10) can connect to the exhaust outlet 50b (see FIG. 11) such that the connecting pipe 30 and the exhaust outlet 50b are in fluid communication. A downstream port 30b of the connecting pipe 30 can connect to a front wall 31g of the second muffler 31 such that the connecting pipe 30 and the second muffler 31 are fluidly connected.

In the illustrated embodiment, the left and right junction pipes 28a and 28b are connected with the front wall 29g of the first muffler 29 and the upstream port 30a and the downstream port 30b of the connecting pipe 30 are connected with the right wall 29h of the first muffler 29 and the front wall 31g of the second muffler 31, respectively. Thus, the first and second mufflers 29 and 31 and the exhaust pipe unit 25a can be arranged in a balanced manner.

With reference to FIG. 3 and FIG. 11, an exhaust valve 37 preferably is disposed within the connection pipe 30. The illustrated exhaust pipe 37 comprises a valve stem 37b that penetrates through the connecting pipe 30 in the radial direction and a valve plate 37a that is fixed to the valve stem 37b. The exhaust valve 37 can vary the passage area in the connecting pipe 30. The valve stem 37b is inclined such that the valve stem 37b rotates about an axis that generally intersects the projected intersection of the left and right inclined sides 31a, 31a. The upper end of the valve stem 37b preferably extends outside of the connection pipe 30.

A driving cable 39 connects with the valve stem 37b via a pulley 38. The illustrated driving cable 39 extends upward along the inner surface of the rear arm bracket 2b (see FIGS. 2 and 3) to connect with a driving motor (not shown). Preferably, the exhaust valve 37 closes the passage at the time of the low-speed revolution including during engine start-up, and opens the passage at the time of high-speed revolution. Accordingly, the engine output is increased while noise generated in the low-revolution operational range is reduced.

Figure 7:
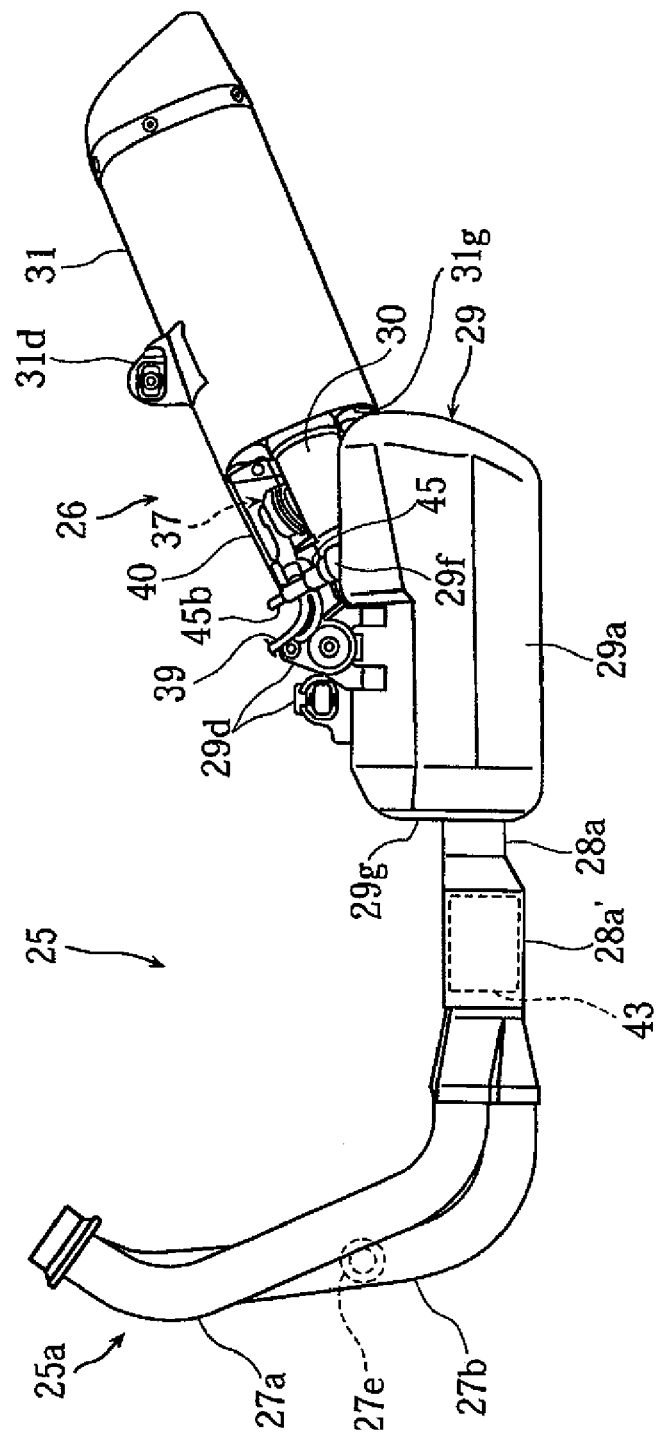
FIG. 7 is a side view of the exhaust system of FIG. 1.
Figure 8:
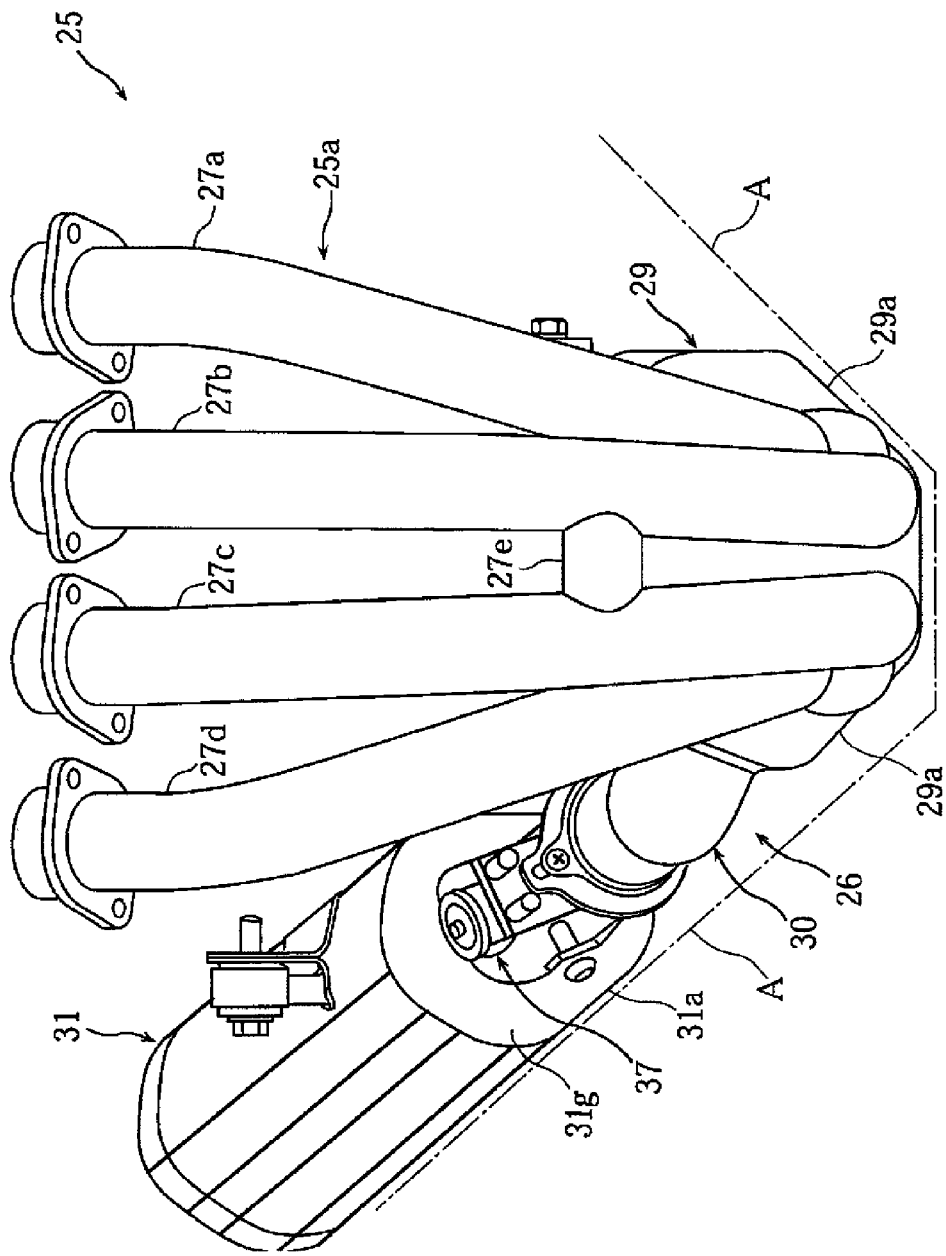
FIG. 8 is a front view of the exhaust system of FIG. 1.

With reference to FIG. 7, the exhaust valve 37 is covered by a cover 40 of the second muffler 31. Preferably, the cover 40 extends over substantially all of the second muffler 31. More preferably, the cover 40 connects to the first muffler 29. Thus, the cover 40 advantageously can provide an external appearance that the first and second mufflers 29, 31 are integrally formed.

With reference to FIG. 6, large-diameter portions 28a' and 28b' of the left and right junction pipes 28a and 28b expand downward and are formed at positions upstream of the connecting positions between the junction pipes 28a and 28b and the first muffler 29. More specifically, in one configuration, the large-diameter portions 28a' and 28b' are disposed such that their edges do not project outside the inclined portions 29a of the first muffler 29 and such that they preferably lie inside the inclined portions 29a. Thus, even where the large-diameter portions 28a' and 28b' are formed, the large diameter portions 28a' and 28b' do not adversely limit the amount of bank provided to the illustrated configuration.

A first catalyst 43 can be provided within the large-diameter portions 28a' and 28b'. The main function of the first catalyst 43 is purification of hydrocarbons generated during engine start-up. Because the first catalyst 43 is disposed within the large-diameter portions 28a' and 28b' in the exhaust junction pipes 28a and 28b, the likelihood of increased flow passage resistance can be greatly reduced. Moreover, since the first catalyst 43 is located upstream of the first muffler 29, i.e., near the engine 15, activation speed of the catalyst 43 at the time of engine start-up can be increased.

With reference to FIG. 11, a second catalyst 44a can be provided within the second communicating pipe 44, which is disposed at the juncture between the first expansion chamber b and the second expansion chamber a in the first muffler 29. The second catalyst 44a can comprise a wide oblong shape (i.e., have a major axis extending in the transverse direction as viewed in cross-section view (see FIG. 12)). The second communicating pipe 44 preferably is connected to the partition wall 35 in a substantially air-tight manner. The second communicating pipe 44 also preferably penetrates through the partition wall 35 to connect the first expansion chamber b and the second expansion chamber a such that these chambers are in fluid communication with each other. Because an appropriate clearance is provided between the first and second catalysts 43 and 44a, exhaust gas purification can be performed in a broad operational range.

A detection section 45a, which comprises an oxygen sensor 45 or another suitable sensor, can be inserted into the first expansion chamber b of the first muffler 29 and can be attached to the chamber b. In this configuration, because the detection section 45a of the sensor 45 is positioned in the first expansion chamber b of the first muffler 29, the detection section 45a detects the oxygen concentration of the exhaust gas having passed through the first catalyst 43. It is therefore possible to better detect the air fuel ratio around the stoichiometric ratio at which all NOX, CO, and HC included in the exhaust gas can be effectively purified.

The oxygen sensor 45 can be secured to a boss 29f formed on the right edge of the upper wall of the illustrated first muffler 29. In this manner, the oxygen sensor 45 is disposed in such a position as to be directed toward the inside front F of the right foot rest 21. Other configurations also can be used. Leads 45b connected with the oxygen sensor 45 preferably pass along the inside of the brake pedal 22 and extend together with the driving cable 39. The leads 45b can be joined with the driving cable 39 and can be clamped to the foot rest bracket 20. Because the oxygen sensor 45 is disposed in such a position as to be directed to the inside front of the right foot rest 21, the leads 45b of the oxygen sensor 45 that extend along the inside of the foot rest 21 and along the rear arm bracket 2b can be coupled with the driving cable 38 of the exhaust valve 37, the leads of a brake lamp switch and the like. Thus, no dedicated bracket and clamp for the leads 45b of the oxygen sensor 45 are required.

In the illustrated configuration, exhaust gas passes through the respective exhaust pipes 27a through 27d and reaches the left and right junction pipes 28a and 28b, where the gas is purified by the first catalyst 43 and flows into the first expansion chamber b. Then, the exhaust gas coming from the first expansion chamber b is purified by the second catalyst 44a while passing therethrough, and flows into the second expansion chamber a. Thereafter, the exhaust gas coming from the second expansion chamber a flows through the connecting pipe 30 into the second muffler 31. Finally, the exhaust gas is discharged through the discharge port 31b of the second muffler 31.

With reference now to FIGS. 13 through 19, shown therein is another exhaust system that is arranged and configured in accordance with certain features, aspects and advantages of the invention. In these figures, reference numerals used in FIGS. 1 through 12 refer to similar or corresponding components.

The exhaust system 25 in this embodiment comprises an exhaust pipe unit 25a, a first muffler 29 and a second muffler 31. The exhaust pipe unit 25a preferably connects with the engine 15. The first muffler 29 preferably extends below the engine and attaches to the cross frame member of the rear arm bracket 2b. The second muffler 31 connects with the first muffler 29 via connecting pipes 60 and 61 and extends along the right side of the rear wheel 8 in the illustrated configuration. Thus, the basic structure of the illustrated exhaust system 25 in this embodiment is substantially the same as that in the first embodiment. In this configuration, the first muffler 29 is disposed below the engine 15. Thus, the center of gravity of the vehicle body is located at a lower position. Accordingly, the rolling inertia can be reduced, and the weight of the vehicle body can be easily balanced in the front-to-rear direction.

Figure 18:
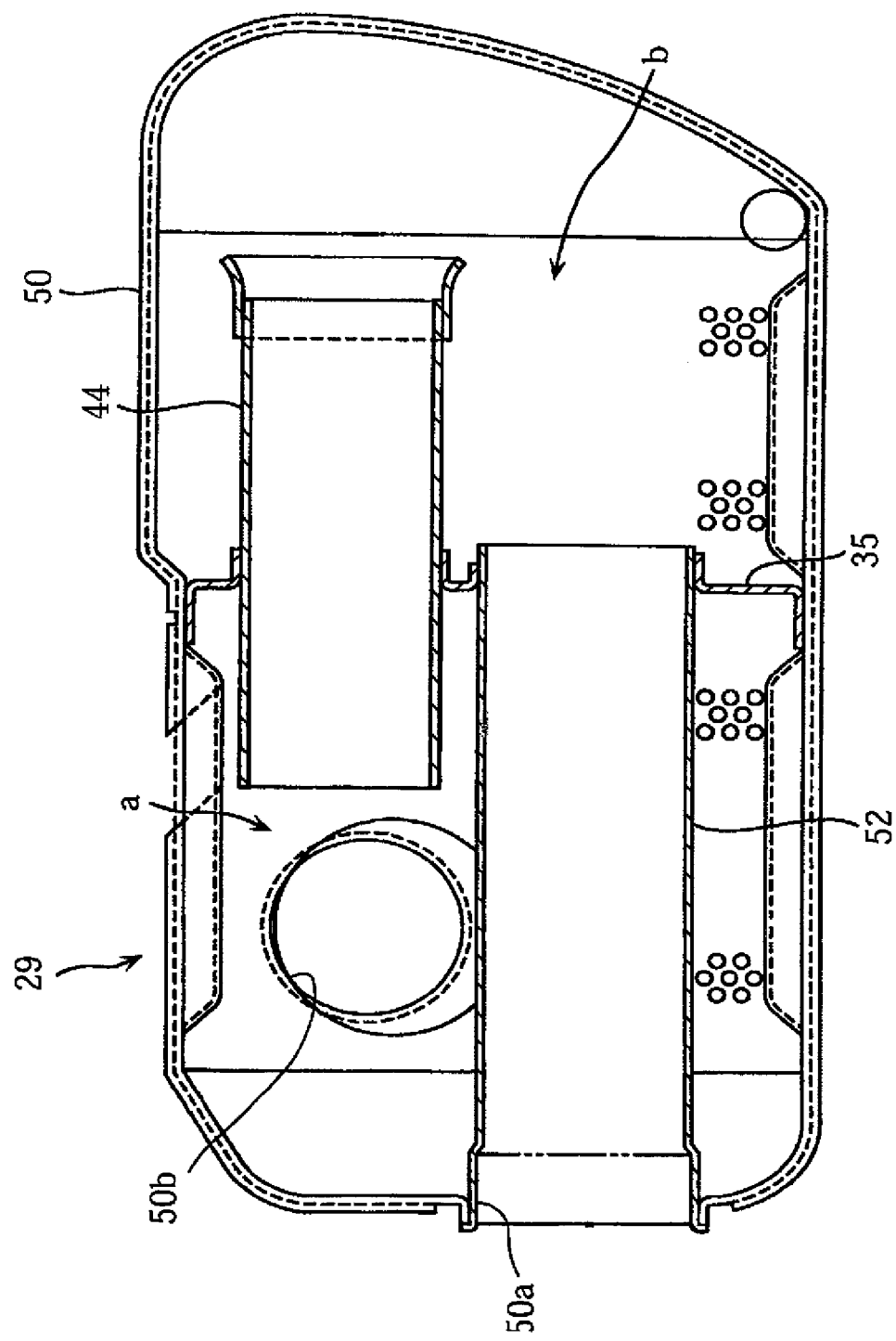
FIG. 18 is a side cross-sectional view of a first muffler of the exhaust system of FIG. 13.

With reference to FIG. 18, the first muffler 29 comprises a substantially rectangular outside wall member 50 that is elongated in the front-to-rear direction. The first muffler 29 also comprises a pair of left and right exhaust inlets 50a formed on the front wall of the outside wall member 50. A partition wall 35 divides the inside of the wall member 50 into a forward second expansion chamber a and a rearward first expansion chamber b. An exhaust outlet 50b can be formed as a single opening formed along the right side surface of the outside wall member 50 toward the front. The exhaust outlet 50b preferably is formed in the second expansion chamber a.

In a preferred configuration, the second and first expansion chambers a and b of the first muffler 29 communicate with each other through a second communicating pipe 44 that extends through or penetrates the partition wall 35. The left and right exhaust inlets 50a and the first expansion chamber b can communicate with each other through a pair of the left and right first communicating pipes 52, 52. The left and right junction pipes 28a and 28b cab be connected with the left and right first communicating pipes 52.

The left and right first communicating pipes 52, 52 can be arranged in parallel in the transverse direction and can be positioned within the lower region of the first muffler 29. The second communicating pipe 44 can be disposed above the first communicating pipes 52. Preferably, the second communicating pipe 44 comprises an oblong shape in cross-section, which is elongated in the transverse direction. The exhaust outlet 50b can be formed so that it faces the downstream end of the second communicating pipe 44 of the second expansion chamber a and such that it is located generally above the first communicating pipes 52.

In this embodiment, the left and right first communicating pipes 52, 52 are positioned within the lower region of the first muffler 29, and the second communicating pipe 44 is located above the first communicating pipes 52. The transverse cross section of the second communicating pipe 44 has the oblong configuration that is elongated in the transverse direction. Accordingly, the length of the first muffler 29 in the vehicle width direction can be reduced and enlargement in the size of the first muffler 29 can be mitigated when the first muffler 29 is used as a common muffler for the respective cylinders.

Figure 19:
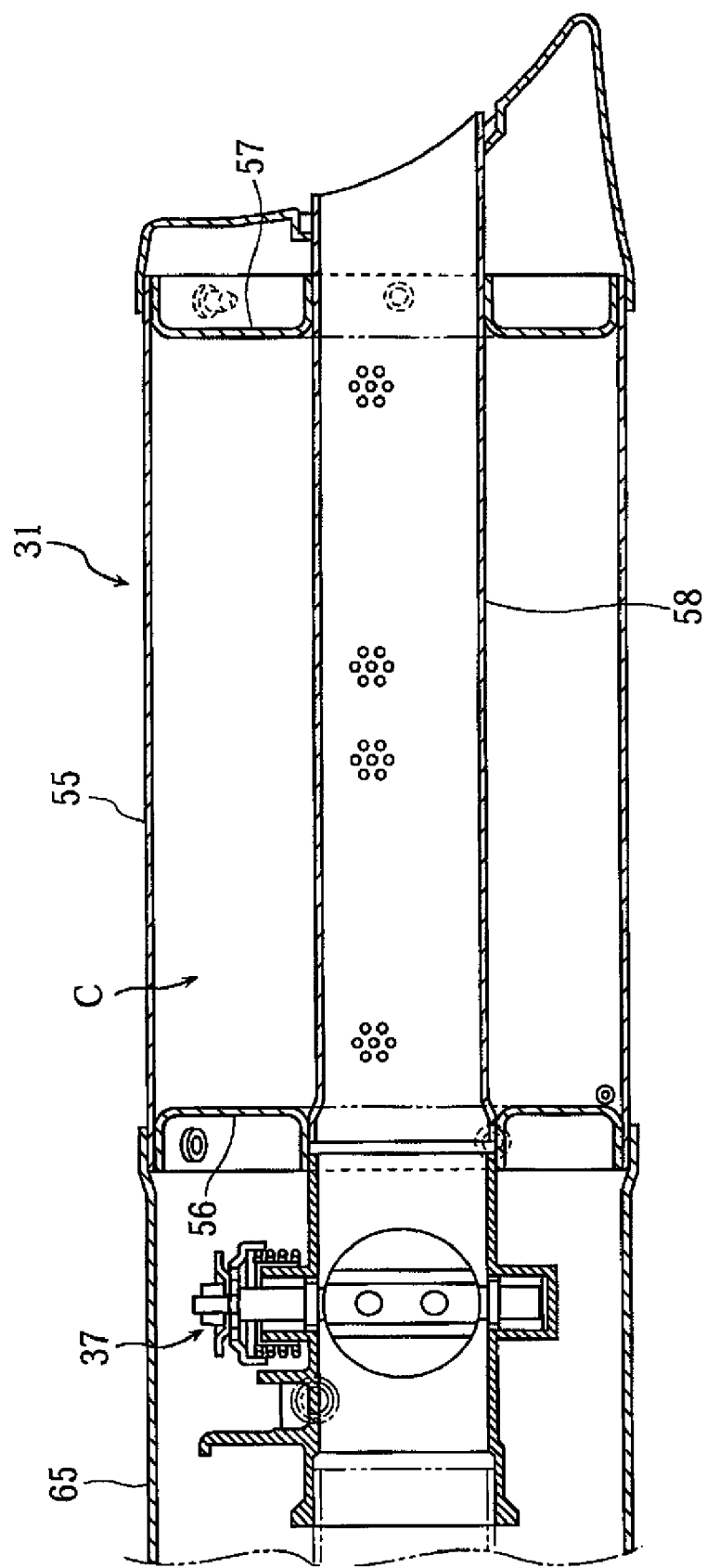
FIG. 19 is a side cross-sectional view of a second muffler of the exhaust system of FIG. 13.

With reference now to FIG. 19, the second muffler 31 preferably comprises an outer member 55 that is substantially cylindrical in configuration. Other configurations also are possible. The second muffler 31 also can comprise front and rear lids 56 and 57 that enclose both ends of the outer member 55. In the preferred configuration, an inner member 58 is formed by punching and rolling a metal sleeve. The inner member 58 can be inserted into the outer cylindrical member 55 such that the inner cylindrical member 58 extends through or penetrates the front and rear lids 56 and 57. A third expansion chamber c can be defined between the outer cylindrical member 55 and the inner cylindrical member 58. The third expansion chamber c can be filled with sound absorbing material, such as glass wool, for instance but without limitation.

Figure 16:
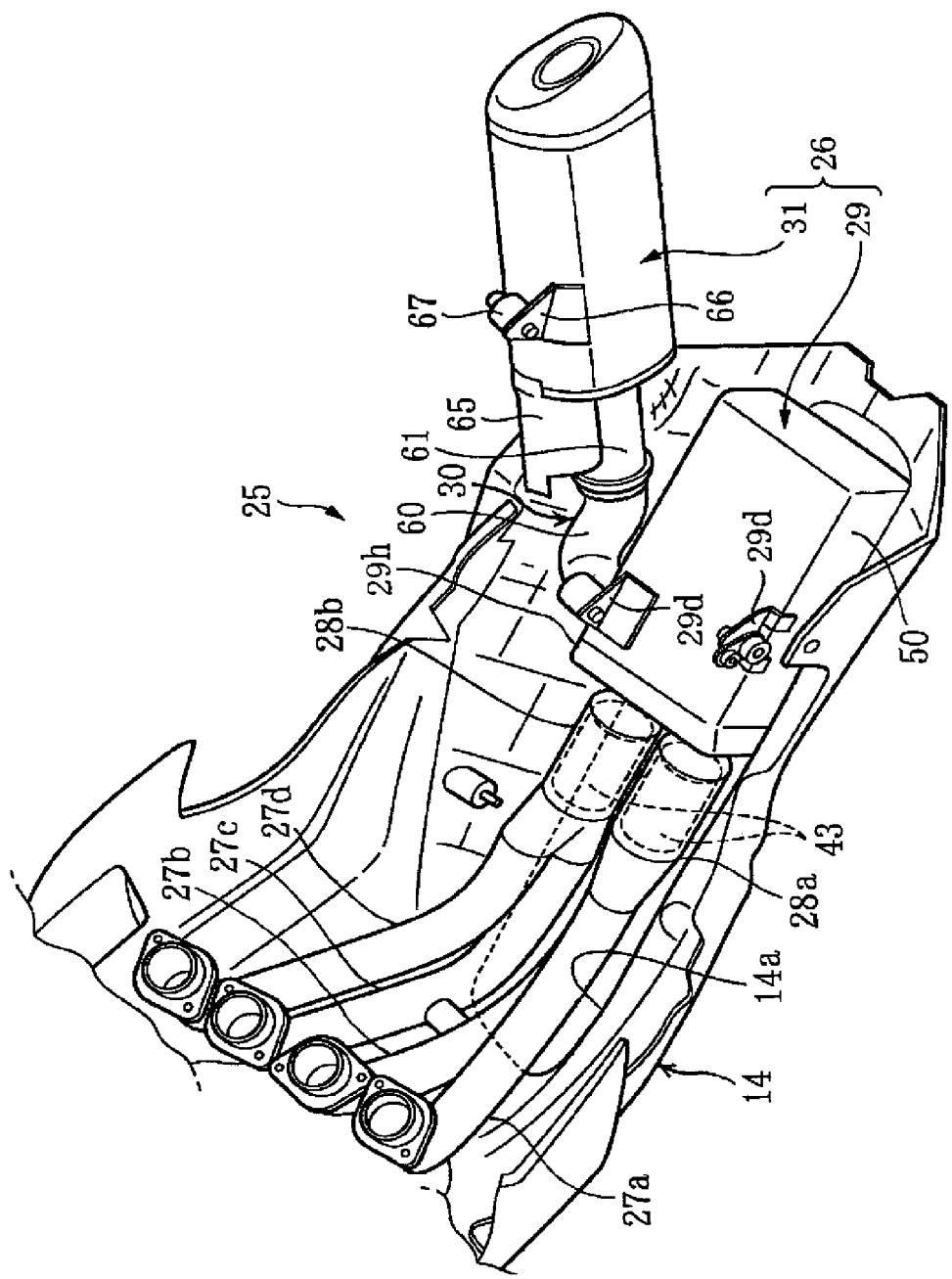
FIG. 16 is a perspective view of the exhaust system as viewed diagonally from above the exhaust system of FIG. 13.
Figure 17:
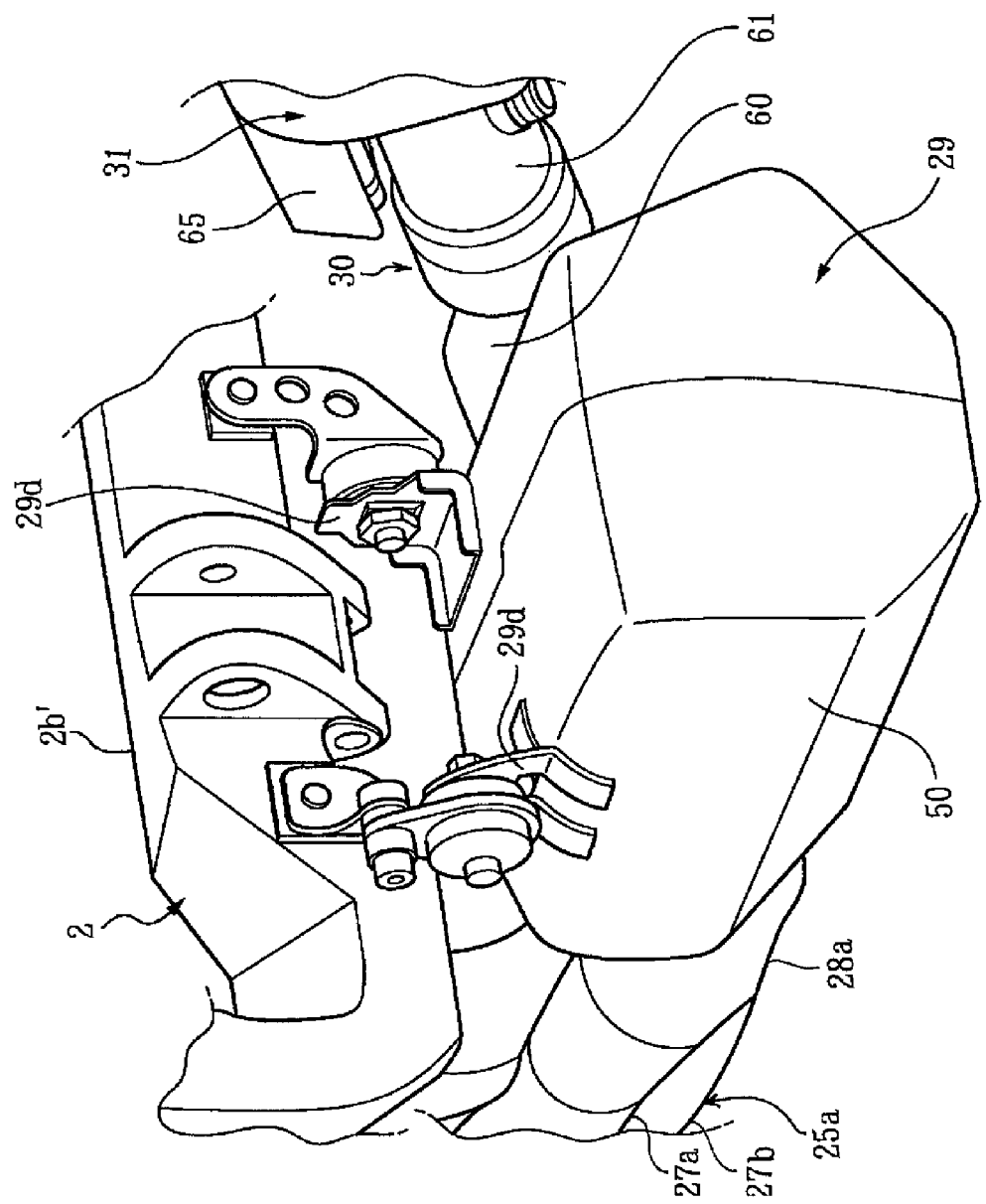
FIG. 17 is a perspective view of a portion of the exhaust system of FIG. 13 as viewed from the diagonal rear.

With reference to FIG. 16, the first connecting pipe 60 can be connected with the exhaust outlet 50b (see FIG. 18) formed on the wall 29h of the first muffler 29. The second connecting pipe 61 preferably communicates with the inner cylindrical member 58 can connects with the front lid 56 of the second muffler 31. The first and second connecting pipes 60 and 61 connect with each other and comprise a connecting passage for connecting the sidewall rear portion of the first muffler 29 and the front wall of the second muffler 31 such that the two mufflers 29, 31 communicate with each other. The exhaust valve 37 described above can be disposed in the second connecting pipe 61.

Because the first and second mufflers 29 and 31 are separately disposed such that the first muffler 29 is below the engine 15 and the second muffler 31 is in the vicinity of the right side of the rear wheel 8, sufficient capacity of the first muffler 29 can be secured without interference with the rear wheel 8. Moreover, because the distance from the front wheel 5 is increased, the exhaust pipe unit length is lengthened. Therefore, engine performance of a vehicle including a high-output engine can be enhanced.

Because the side wall of the first muffler 29 and the front wall of the second muffler 31 are connected via the first and second connecting pipes 60 and 61, the first and second mufflers 29 and 31 can be separately disposed without increasing the distance between them. Such a structure provides a compact arrangement of the first and second mufflers 29 and 31 while greatly reducing the likelihood of interference with the engine 15, the rear wheel 8, the rear arm 7 and other components.

A heat insulating cover 65 can be provided. In the illustrated configuration, the cover 65 covers the outer portions of the second connecting pipe 61, preferably including the region housing the exhaust valve 37. The heat insulating cover 65 protects an actuator of the exhaust valve 37 from external forces and reduces the likelihood of heat transmission to the legs of a rider from the second muffler 31.

A bracket 66 can be attached to the upper surface of the outer member 55 of the second muffler 31. The bracket 66 can be secured to the foot rest bracket 20 via a damper 67. Other suitable mounting configurations also can be used.

Preferably, the second muffler 31 is positioned along the rear arm 7. In one configuration, the second muffler 31 is positioned along the right arm 7a. As illustrated, to provide a more compact configuration, a recess 7b can be formed on the right arm member 7a. thus, the recess 7b allows movement of the rear arm 7 while reducing the likelihood that the second muffler 31 will interfere with the movement. In an advantageous configuration, the clearance recess 7b provides a predetermined clearance S between the outer peripheral surface of the second muffler 31 and the right arm member 7a.

Figure 14:
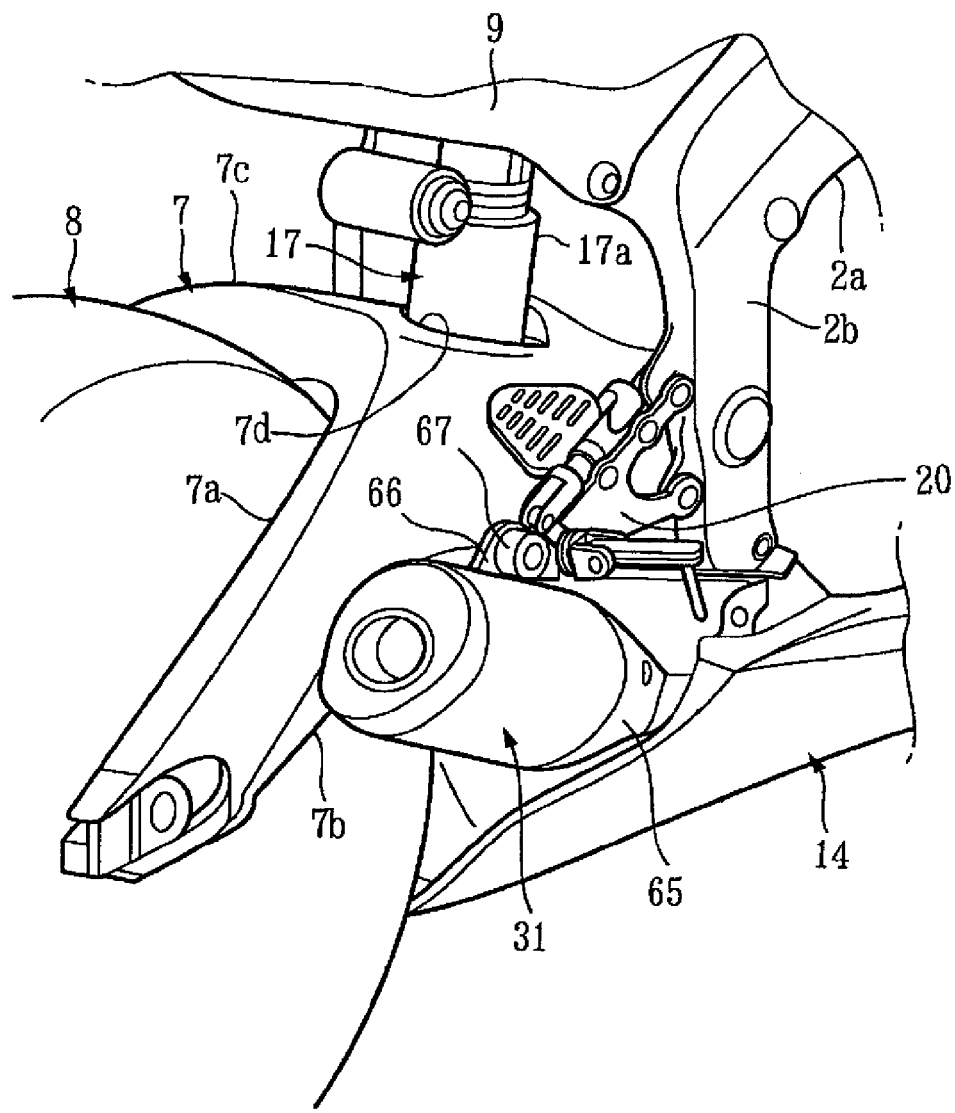
FIG. 14 is a perspective view of the exhaust system of FIG. 13 as viewed from a rear lateral side.
Figure 15:
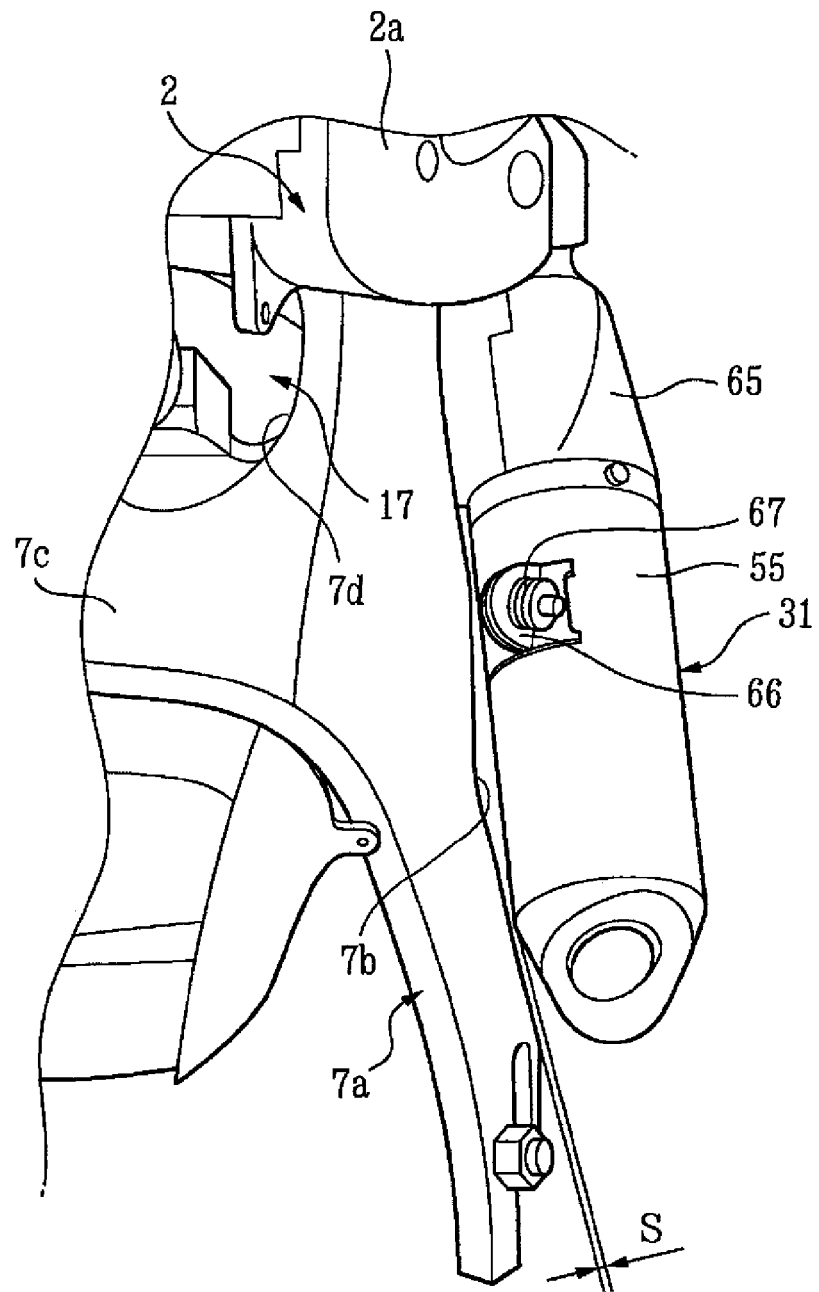
FIG. 15 is a plan view of the exhaust system of FIG. 13.

The rear suspension 17 described above can be interposed between the rear arm 7 and the vehicle body frame 2. As illustrated in FIG. 14, the damper 17a of the rear suspension 17 can be positioned within an insertion hole 7d formed at the center of a pivot base 7c of the rear arm 7 in the vehicle width direction. The rear suspension 17 can be disposed so as to be positioned above the first muffler 29. In such a configuration, the rear suspension 17 can be provided while effectively utilizing the vacant space above the compact first muffler 29.

The lower portion and the left and right sides of the first muffler 29 can be covered by the under cowl 14 described above. A front opening 14b for introducing a flow of air generated during movement of the vehicle can be formed on the front surface of the under cowl 14. A discharge opening 14a for discharging the introduced air to the outside can be formed on the bottom of the under cowl 14. The discharge opening 14a preferably comprises a front-to-rear length extending from the front ends of the left and right junction pipes 28a and 28b to the rear end of the first muffler 29.

The air introduced through the front opening 14b into the under cowl 14 can be supplied to the respective exhaust pipes 27a-27d, the left and right junction pipes 28a and 28b, and the outer surface of the first muffler 29. The air having cooled these components can be discharged through the discharge opening 14a to the outside.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Furthermore, features shown and described with regard to one embodiment can be used on other embodiments such that various features of the illustrated and described embodiments admit to mixing and matching. Moreover, not all of the features, aspects and advantages are necessarily required to practice the present invention. Accordingly, the scope of the present invention is intended to be defined only by the claims that follow.

What is claimed is:

1. A motorcycle comprising:
an engine, an exhaust pipe unit connected with the engine at a first end, the exhaust pipe unit extending between the engine and a surface over which the motorcycle operates; and
a muffler unit connected with the exhaust pipe unit, the muffler unit comprising a first muffler and a second muffler;
the first muffler being connected with a second end of the exhaust pipe unit, the first muffler comprising a rearward first expansion chamber and a forward second expansion chamber, a first connecting pipe fluidly connecting the exhaust pipe unit and the first expansion chamber, the first connecting pipe extending through the second expansion chamber, and a second connecting pipe connecting the first expansion chamber and the second expansion chamber, the first connecting pipe extending through the muffler at a lower position than the second connecting pipe, the second muffler including a third expansion chamber connected with the second expansion chamber the first muffler being positioned between the engine and a rear wheel, the first muffler comprising inclined lateral side walls extending at a first angle such that the inclined lateral side walls extend upward and outward when viewed from a front of the vehicle; and
the second muffler being connected with the first muffler and being disposed near the side of the rear wheel, and the second muffler extending rearward of the first muffler while being laterally inclined at a second angle approximately equal to the first angle of the inclined lateral side walls of the first muffler.

2. The motorcycle of claim 1, wherein the transverse cross section of the second connecting pipe is an oblong shape that is elongated is the transverse direction.

3. A motorcycle comprising:
an engine, an exhaust pipe unit connected with the engine at a first end, the exhaust pipe unit extending between the engine and a surface over which the motorcycle operates; and a muffler unit connected with the exhaust pipe unit, the muffler unit comprising a first muffler and a second muffler;

the first muffler being divided into a rearward first expansion chamber and a forward second expansion chamber, the first and second expansion chambers communicating with each other through a communicating pipe, a first catalyst being provided within the exhaust pipe unit proximate the first muffler and a second catalyst being provided within the communicating pipe of the first muffler;

the first muffler being connected with a second end of the exhaust pipe unit, the exhaust pipe unit extending through the second expansion chamber into the first expansion chamber;

the first muffler being positioned between the engine and a rear wheel, the first muffler comprising inclined lateral side walls extending at a first angle such that the inclined lateral side walls extend upward and outward when viewed from a front of the vehicle;

the second muffler being connected with the first muffler and being disposed near the side of the rear wheel, the second muffler extending rearward of the first muffler while being laterally inclined at a second angle approximately equal to the first angle of the inclined lateral side walls of the first muffler, a generally vertical plane generally bisecting the rear wheel and an inclined plane extending along an outer portion of the second muffler, the generally vertical plane and the portion of the exhaust pipe unit in which the first catalyst is provided being positioned to a single side of the inclined plane as viewed from the front of the vehicle.

4. A motorcycle comprising:

an engine, an exhaust pipe unit connected with the engine at a first end, the exhaust pipe unit extending between the engine and a surface over which the motorcycle operates; and a muffler unit connected with the exhaust pipe unit, the muffler unit comprising a first muffler and a second muffler;

the first muffler being connected with a second end of the exhaust pipe unit, the first muffler being divided into a rearward first expansion chamber and a forward second expansion chamber with the exhaust pipe unit extending through the second expansion chamber into the first expansion chamber, the first and second expansion chambers communicating with each other through a communicating pipe, an oxygen sensor being inserted into the first expansion chamber of the first muffler and being positioned such that its body extends toward an inside front portion of a foot rest, the first muffler being positioned between the engine and a rear wheel, the first muffler comprising inclined lateral side walls extending at a first angle such that the inclined lateral side walls extend upward and outward when viewed from a front of the vehicle; and the second muffler being connected with the first muffler and being disposed near the side of the rear wheel, and the second muffler extending rearward of the first muffler while being laterally inclined at a second angle approximately equal to the first angle of the inclined lateral side walls of the first muffler.

5. A motorcycle comprising:

an engine, an exhaust pipe unit connected with the engine at a first end, the exhaust pipe unit extending between the engine and a surface over which the motorcycle operates; and a muffler unit connected with the exhaust pipe unit, the muffler unit comprising a first muffler and a second muffler;

the first muffler being connected with a second end of the exhaust pipe unit, the first muffler being positioned between the engine and a rear wheel, the first muffler comprising inclined lateral side walls extending at a first angle such that the inclined lateral side walls extend upward and outward when viewed from a front of the vehicle; and the second muffler being connected with the first muffler and being disposed alongside a rear arm and near the side of the rear wheel, and the second muffler extending rearward of the first muffler while being laterally inclined at a second angle approximately equal to the first angle of the inclined lateral side walls of the first muffler, the rear arm supporting the rear wheel, and a clearance recess being defined in the rear arm adjacent to the second muffler.

6. A motorcycle comprising:

an engine, an exhaust pipe unit connected with the engine at a first end, the exhaust pipe unit extending between the engine and a surface over which the motorcycle operates; and a muffler unit connected with the exhaust pipe unit, the muffler unit comprising a first muffler and a second muffler;

the first muffler being connected with a second end of the exhaust pipe unit, the first muffler being positioned between the engine and a rear wheel, the first muffler comprising inclined lateral side walls extending at a first angle such that the inclined lateral side walls extend upward and outward when viewed from a front of the vehicle, the first muffler comprising an upper wall extending above at least one of the inclined lateral side walls that extend at the first angle, the connecting pipe extending from the upper wall, the upper wall extending at a third angle which extends upward and inward when viewed from the front of the vehicle; and the second muffler being separate of the first muffler and connected with the first muffler through a connecting pipe such that respective interiors of the first and second mufflers are in fluid communication with each other through the connecting pipe and being disposed near the side of the rear wheel, the connecting pipe having a diameter that is significantly less than the first muffler and the second muffler, and the second muffler extending rearward of the first muffler while being laterally inclined at a second angle approximately equal to the first angle of the inclined lateral side walls of the first muffler.

* * * * *